P. STEULER.
LINE FASTENER.
APPLICATION FILED JULY 19, 1912.
1,135,736.
Patented Apr. 13, 1915.
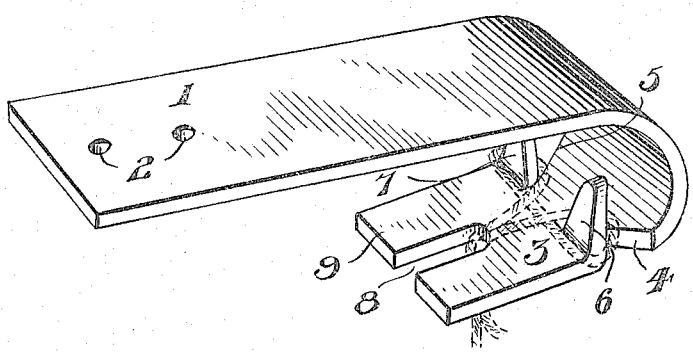
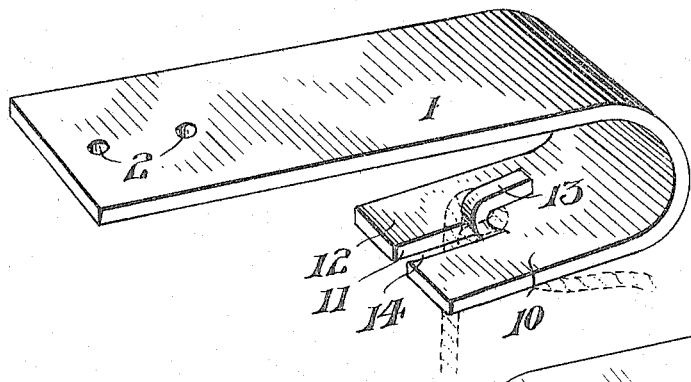
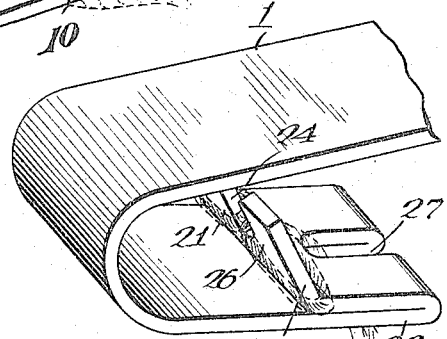
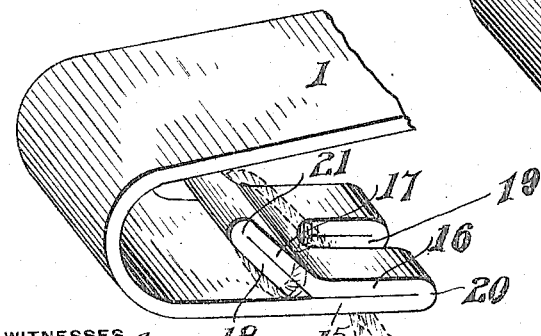
INVENTOR
P. Steuler

UNITED STATES PATENT OFFICE.

PHILIPP STEULER, OF PITTSBURGH, PENNSYLVANIA.

LINE-FASTENER.

1,135,736.  Specification of Letters Patent.  Patented Apr. 13, 1915.

Application filed July 19, 1912. Serial No. 710,436.

*To all whom it may concern:*

Be it known that I, PHILIPP STEULER, a citizen of the United States of America, residing at Pittsburgh, in the county of Allegheny and State of Pennsylvania, have invented certain new and useful Improvements in Line-Fasteners, of which the following is a specification, reference being had therein to the accompanying drawing.

This invention relates to line fasteners and has for its object to provide a device of such class in a manner as hereinafter set forth with means for fixedly securing from slipping a line when brought into engagement with said means. Although the line fasteners are designed primarily for use in connection with clothes lines, yet it is to be understood that it is adapted for any purpose wherein it is found applicable.

Further objects of the invention are to provide a line fastener with means in a manner as hereinafter set forth to permit of the line being connected thereto by different wraps or bends in the line intermediate its ends, or at an end, said means preventing the slipping of the lines after being wrapped or bent in engagement therewith.

Further objects of the invention are to provide a line fastener which is simple in its construction and arrangement, strong, durable, efficient and convenient in its use, readily set up and inexpensive to manufacture.

With the foregoing and other objects in view the invention consists of a novel construction, combination and arrangement of parts as hereinafter more specifically described and illustrated in the accompanying drawings wherein is shown an embodiment of the invention, but it is to be understood that changes, variations and modifications can be resorted to which come within the scope of the claim hereunto appended.

In the drawings wherein like reference characters denote corresponding parts throughout the several views:—Figure 1 is a perspective view of a line fastener in accordance with this invention, and Figs. 2 to 4 are perspective views of modified forms.

Each of the line fasteners as illustrated is formed from an oblong strip of metallic material of desired thickness bent to form a hook-shaped member, and each includes a body portion or shank 1 provided near one end with a plurality of openings 2 for the passage of hold-fast devices to fixedly secure the body portion 1 in position.

Referring to Fig. 1, the strip is bent upon itself to provide a hook having a bill 3, the latter being spaced from and arranged forwardly of the lower portion of the shank 1. The shank 1 provides means for securing the bill 3 forwardly of a support so that a rod can be secured to the bill. By providing the shank with a bill, a line can be passed around the bill and secured in position whether the shank depends from a support or whether the shank abuts throughout against a support. Each side of the bill 3 is slitted inwardly and upwardly at an inclination as at 4 and 5. The material separated by the slits is bent inwardly at right angles to provide a pair of tapering lugs 6 and 7 which are positioned near the lower portion of the bill. The upper portion of the bill 3 is formed with a centrally disposed slot 8 opening at the upper edge 9 of the bill 3. In the form shown in Fig. 1 the line can be wrapped around either or both of the lugs and pass through the slot 8 or pass through the slot 8 and around one or both of the lugs. The tighter the line is drawn the tighter the wraps or bends of the line grasp the bill.

In the form shown in Fig. 2 the strip is bent upon itself to provide an inwardly extending bill 10 which is spaced from the body portion or shank 1 and provided with a longitudinally extending pair of spaced slits 11 which extend from the upper edge 12 of the bill 10 to approximately half the length thereof. The material between the slits is bent rearwardly to provide a lug 13 having a portion of its length extending parallel and spaced from the inner face of the bill.

In the form shown in Fig. 2 the line can be wrapped around the bill to engage under the lug 13 and then pass through the space 14, which constitutes a slot.

Referring to Fig. 3 the strip is bent upon itself to provide a bill 15, the latter being bent upon itself as at 16 then inwardly at an inclination as at 17 and then upon itself as at 18. The portions 17, 18 provide a rearwardly extending lug. That portion of the bill which is engaged by the portion 16 is cut away to provide a centrally disposed slot 19 opening at the bend 20. In the form shown in Fig. 3 the lines can be wrapped around the bill to engage under the lug referred to by the reference character 21 and then through the slot 19. In either of the forms shown after the lines have been wrapped around the bill in a desired manner and passed outwardly through the slot or inwardly through the slot, the more that the line is pulled on the tighter the wraps engage with the bill.

In the form shown in Fig. 4 the bill 21 is bent upon itself as at 22 and then rearwardly at an angle as at 23. The angle-shaped portion 23 is slotted as at 24 to provide a pair of lugs 26. The bill 21 as well as the bent portion 22 is formed with a longitudinally extending slot 27 having its outer end open.

In the form shown in Fig. 4 the lines can be wrapped around one or both of the lugs or under the angle-shaped portion 23 and extended through the slot 24 or the line can be passed through the slot 24 and wrapped in any desired manner around the bill and under the angle-shaped portion 23 or around one or both of the lugs 26.

What I claim is:—

A line fastener comprising a hook-shaped member including a shank and a bill, said bill disposed forwardly of and spaced from the lower portion of the shank, said shank constituting means for securing the bill forwardly or rearwardly of and depending from a support and the space between the bill and the shank providing a passage for a line, said shank provided with means for the passage of holdfast devices to fixedly secure the shank to the support, said bill including inwardly extending means around which is adapted to pass the line and further provided with a centrally disposed longitudinally extending slot having its outer end opening at the free edge of the bill said means positioned in proximity to the bottom of said slot and said slot of less length than the length of said bill.

In testimony whereof I affix my signature in the presence of two witnesses.

PHILIPP STEULER.

Witnesses:
MAX H. SROLOVITZ,
KATHERINE ERRETT.

Copies of this patent may be obtained for five cents each, by addressing the "Commissioner of Patents, Washington, D. C."